Oct. 14, 1952     D. A. WALLACE     2,613,914
HOISTING APPARATUS

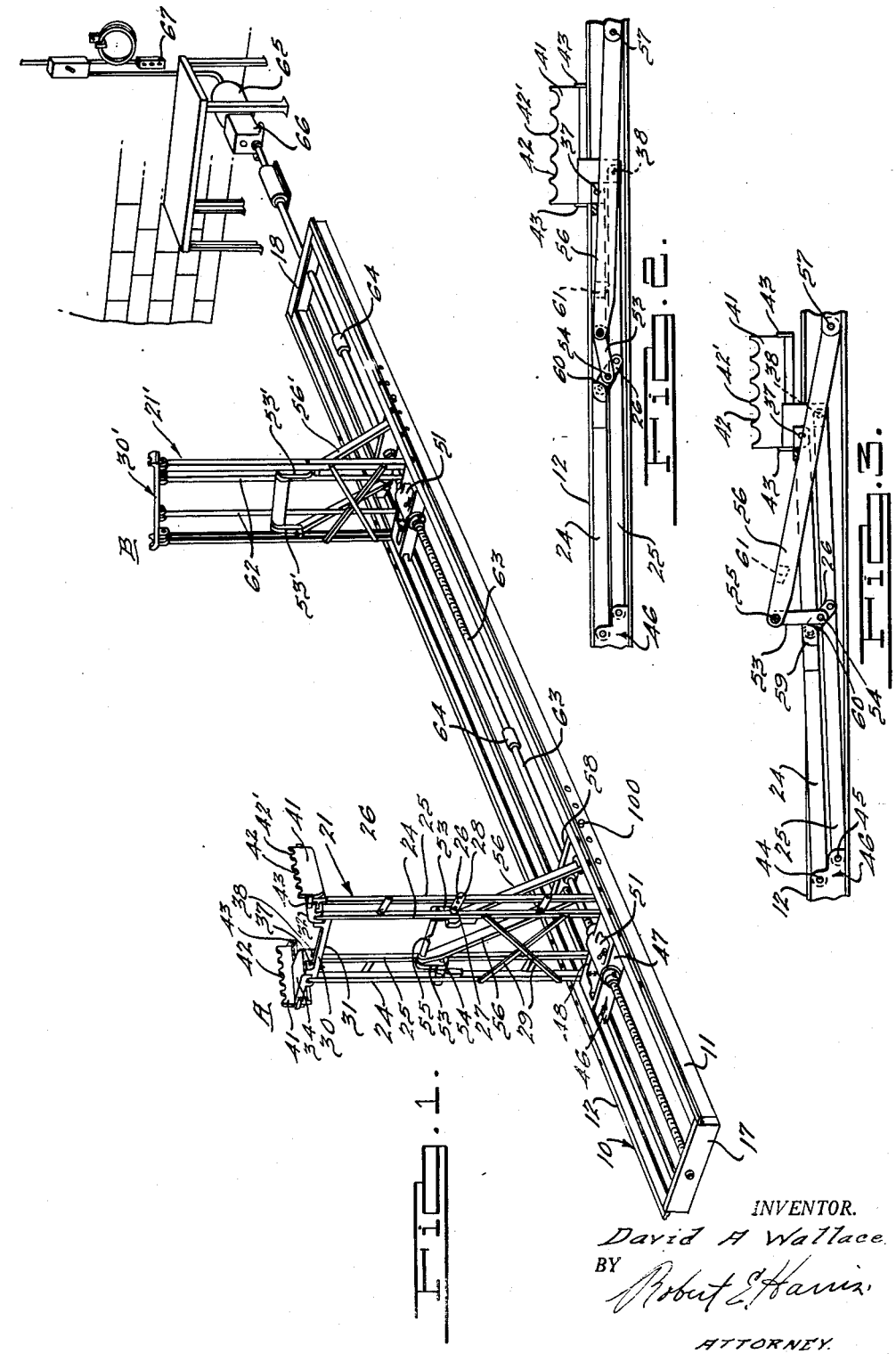

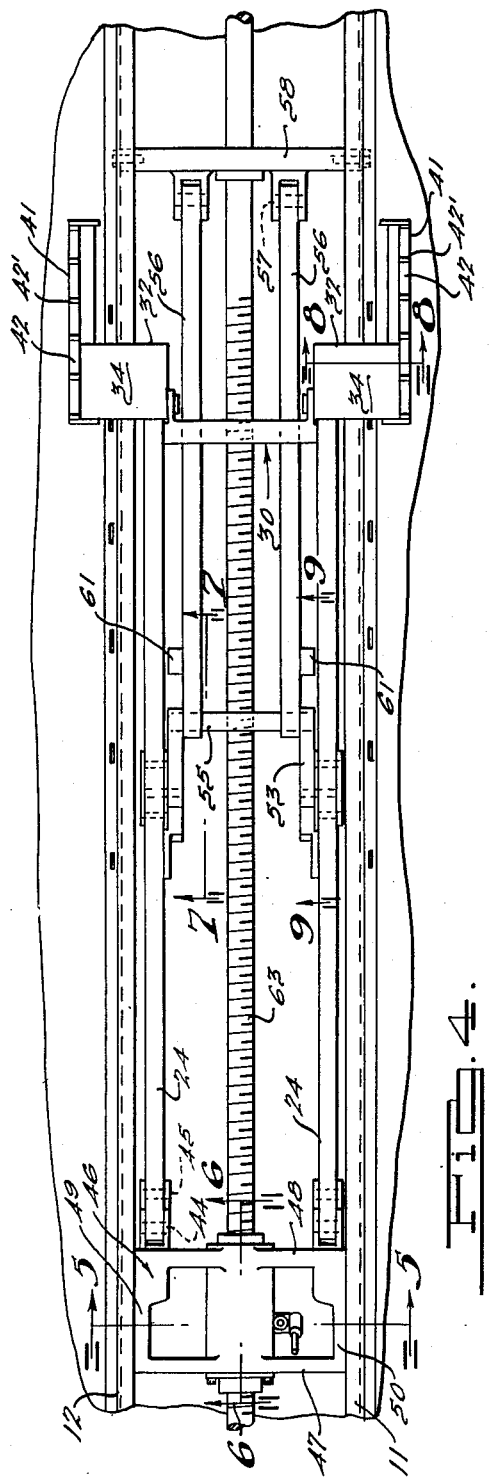

Filed Oct. 8, 1949     3 Sheets-Sheet 3

INVENTOR.
David A. Wallace.
BY Robert E. Harris
ATTORNEY.

Patented Oct. 14, 1952

2,613,914

UNITED STATES PATENT OFFICE 2,613,914

HOISTING APPARATUS

David A. Wallace, Grosse Pointe Farms, Mich.

Application October 8, 1949, Serial No. 120,255

15 Claims. (Cl. 254—89)

This invention relates to improved hoisting apparatus and more particularly to improvements in vehicle hoisting apparatus of the type disclosed in my co-pending applications, Serial Nos. 653,386, 711,649, 775,191 now Patent Nos. 2,576,907, 2,576,158 and 2,576,908, respectively, dated November 27, 1951, 15,827, 34,772 now Patent No. 2,598,200 dated May 27, 1952, and 58,219 now Patent No. 2,598,625 dated May 27, 1952.

One of the main objects of the invention is to provide self-acting adjusting means in hoisting apparatus of this character which is adapted to automatically adjust it to accommodate lifting of vehicles of a relatively wide range of lengths as well as vehicles having lengths within such range which vary in construction and locations of rear axle housings or other points of engagement with the hoisting apparatus.

Another object of the invention is to provide an improved adjustable load receiving seat in hoisting apparatus of this kind which has a shiftable support that is adapted to be moved in respectively opposite directions by engagement with the portion of a vehicle for which it is constructed to be applied in order to accommodate reception of such vehicle portion.

A further object of the invention is to provide a shiftable support in a hoisting apparatus load receiving seat structure which may be applied to a vehicle rear axle housing or other portion of a vehicle at a plurality of locations spaced longitudinally of the hoisting apparatus.

Another object of the invention is to provide an improved dove-tail connection between a vehicle hoisting apparatus load supporting seat structure and a shiftable support element thereof which is adapted to effectively oppose movement of the support element in all directions other than in its intended path of shifting movements.

A still further object of the invention is to provide an improved boom structure in hoisting apparatus of this character which has laterally spaced parallelogram units, each of which includes a pair of load carrying bar members that are spaced apart longitudinally of the apparatus, sufficiently to effectively rigidify the boom structure in its elevated and intermediate positions.

Another object of the invention is to provide load sustaining parallelogram units in a vehicle hoisting apparatus boom structure which serves to maintain the load receiving seat of the hoisting apparatus in horizontal position throughout the entire range of elevating and lowering operation of the hoisting apparatus.

An additional object of the invention is to provide boom elevating and lowering mechanism in hoisting apparatus having the foregoing improved boom structure which, like the boom elevating and lowering mechanism of my co-pending application Serial No. 34,772 now Patent No. 2,598,200, includes a system of links and levers that is brought into a mechanically advantageous arrangement prior to the initial stages of the elevating operation of the boom structure so as to efficiently apply lifting force during the initial stages of raising of the boom.

Another object of the invention is to provide abutments in a link and lever system of this kind which have rounded extremities engageable with parts of the link and lever system for so guiding relative movements of such parts as to relieve the pivots thereof of a substantial portion of the load to which they would otherwise be subjected and particularly when such load is at a high value.

Still further objects of the invention are to provide in screw and nut type power actuating mechanism for operating hoisting units of this kind, an improved clutch unit by which one or more hoisting units may be selectively rendered operative or inoperative respectively while the screw of the mechanism continues to rotate; to provide a simple and rugged clutch unit of this character which is positive in its action and in connection with which the irreversible characteristics of the screw can be utilized to effectively hold a load in a completely or partially hoisted position.

An illustrative embodiment of the invention is shown in the accompanying drawings, in which:

Fig. 1 is a perspective view of hoisting apparatus embodying the invention showing a pair of hoisting units A and B at the left and right ends of the figure, respectively.

Fig. 2 is a fragmentary longitudinal sectional view showing hoisting unit A in its fully contracted lowermost position.

Fig. 3 is a view similar to Fig. 2 but showing the lever system of the hoisting unit thereof shifted from its fully contracted position of Fig. 2 to a more favorable mechanical advantage position preparatory to a hoisting operation.

Fig. 4 is a fragmentary top plan view of hoisting unit A.

Fig. 5 is a transverse sectional view taken on line 5—5 of Fig. 4.

Figure 6:
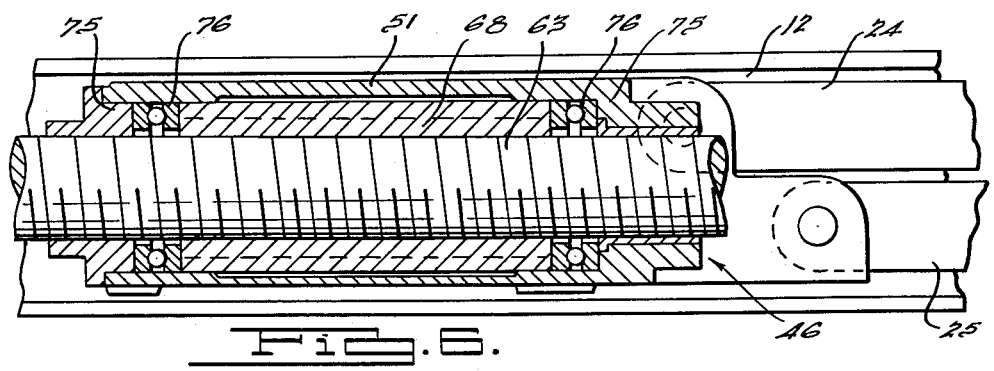
Fig. 6 is a fragmentary, longitudinal sectional view taken on line 6—6 of Fig. 4.
Figure 7:
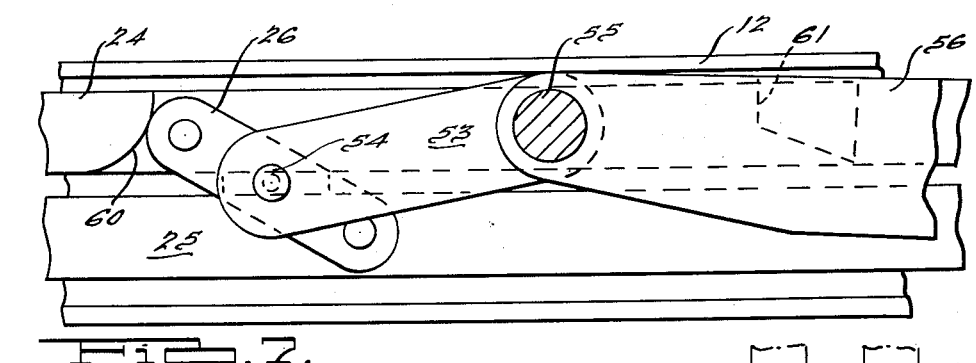
Fig. 7 is a fragmentary longitudinal sectional view taken on line 7—7 of Fig. 4.

In the form of the invention shown in the drawings my improved hoisting apparatus includes a hoisting unit A and a spaced hoisting unit B, each of which are adapted to engage and support different parts of a structure, such as a vehicle, to be hoisted. The hoisting unit A embodies improved features of construction and operation and the hoisting unit B is substantially identical to the hoisting units shown in my co-pending application, Serial No. 34,772, now Patent No. 2,589,200, except that it is provided with improved mechanism for releasably operatively coupling it to a power driven screw. If desired, both hoisting units of the improved hoisting apparatus may be identical in construction to the hoisting unit A, with the exception of the provision of different load receiving seats for receiving different portions of a vehicle or other load.

The improved hoisting apparatus includes a base structure, generally designated by the numeral 10, which comprises spaced rails 11 and 12. The rails 11 and 12 have inwardly facing top flanges 13 and 14 and inwardly facing lower flanges 15 and 16, respectively, and they are connected together at the ends by cross pieces 17 and 18. The entire track structure is preferably disposed in a recess 19 formed in a floor 20 so as to bring the top flanges 13 and 14 substantially flush with the floor, as shown in Fig. 5.

The hoisting unit A includes a boom member, generally designated by the numeral 21, which comprises laterally spaced parallelogram structures, each including a pair of parallel bars 24 and 25. The bars 24 and 25 of each parallelogram structure are flexibly connected together by cleats 26 which are pivoted at 27 and 28 to the bars 24 and 25, respectively. The cleats 26 are parallel to each other and the axes of the pivots 27 and 28 of all the cleats are equally spaced. The bars 24 of the spaced parallelogram structures are connected together by diagonal cross members 29.

Mounted at the upper ends of the bars 24 and 25 is a load receiving seat structure generally designated by the numeral 30, which includes a cross member 31, on the opposite ends of which are provided angle brackets 32 each having an inner substantially vertical flange 33, an inclined flange 34 and an outer substantially vertical flange 35. The upper end portions of the bars 24 are received in slots 36 in the inner vertical flanges 33 of the brackets 32 and they are pivoted to such flanges by pins 37. The upper ends of the bars 25 are received in the slots 36 of the flanges 33 of the brackets 32 and they are pivoted to such flanges by pins 38. The pins 37 and 38 are spaced longitudinally of the apparatus a distance equal to the spacing of the pivots 27 and 28 of the cleats 26 and the pins 37 and 38 are spaced apart vertically the same distance as are the pivots 27 and 28, the pin 37 being at a slightly higher elevation, as viewed in Fig. 1, than the pin 38.

The outer vertical flange 35 of each bracket 32 is provided in its outer side place with a dovetail slot 39 in which is shiftably mounted a dovetail element 40 of a shiftable vertically disposed load receiving support plate 41. The upper edge portion of each plate 41 is scalloped to provide a series of adjacent notches 42 which are separated by relatively pointed teeth 42' having oppositely inclined sides. The plates 41 are longer than the flanges 35 and they are provided on their extremities with flanges 43 for preventing unintended displacement of the plates 41 from the brackets 32.

The lower end portions of the bars 24 and 25 of each parallelogram structure are attached by pivots 44 and 45, respectively, to a shiftable carriage, generally designated by the numeral 46. The pivots 44 and 45 are spaced longitudinally and vertically, respectively, the same distances as are the pivots 27 and 28 of the cleats 26, the pivot 44 being at a higher elevation than the pivot 45 to maintain the parallelogram structure. The carriage 46 preferably comprises a hollow frame-like casting having sides 47 and 48 extending transversely of the track structure and end portions 49 and 50. The sides 47 and 48 are connected together by a hollow cylindrical casing 51 located substantially mid-way between the end portions 49 and 50. Formed on the outer sides of the end portions 49 and 50 are shoes 52, shown in Fig. 5, which engage with the inner sides of the flanges 13, 14, 15 and 16 of the tracks 11 and 12, to shiftably support the carriage 46 for movements longitudinally of the rails 11 and 12 and confine it against lateral and vertical movements.

The hoisting unit A is provided with mechanism for guiding and moving the boom member 21 between its lower, substantially horizontal position between the rails 11 and 12 and its upright position shown in Fig. 1. This mechanism includes a pair of links 53, each pivotally attached at one end by a pin 54 to one of the cleats 26 of each parallelogram structure which is located substantially mid-way between the upper and lower ends of the bars 24 and 25. The other ends of the links 53 are rigidly connected together by a rod 55 extending transversely of the hoisting apparatus. The links 53 and rod 55 form a yoke structure. A lever 56 is disposed adjacent each link 53 with its upper end pivoted on the rod 55 which serves to pivotally connect the upper end of one lever 56 to each link 53, respectively. The lower ends of the levers 56 are pivotally attached at 57 to a cross member 58 which extends between and is preferably releasably fixed to the rails 11 and 12 of the base structure 10, by bolts 100, or other suitable means, which extend through apertures in the rails 11 and 12, as shown in Fig. 1.

Figures 8, 9:
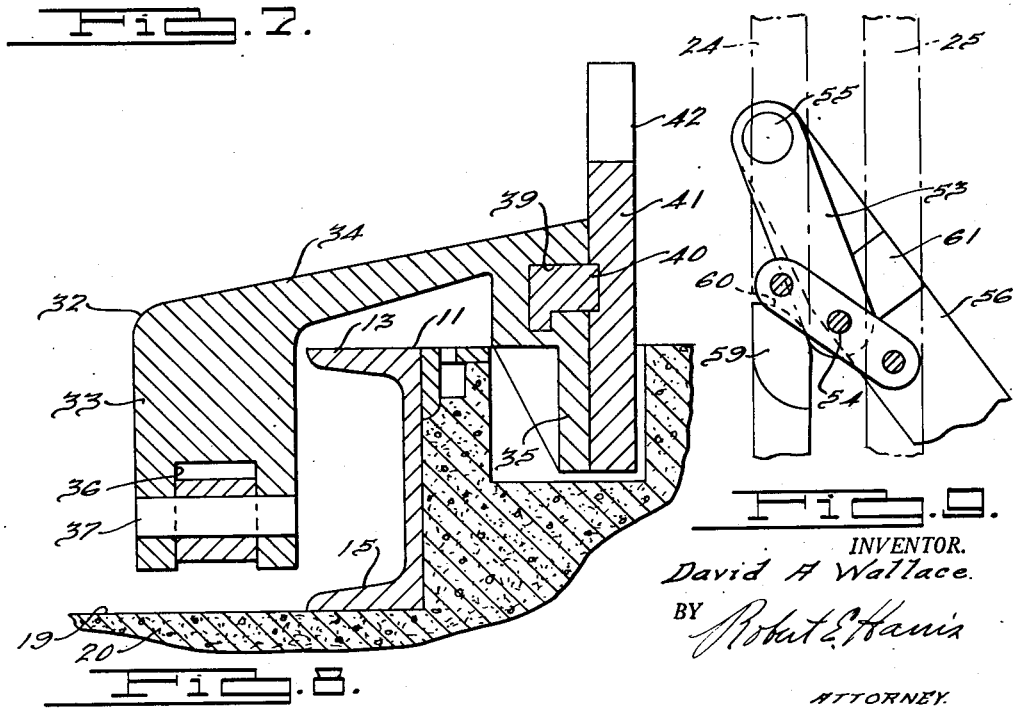
Fig. 8 is a fragmentary, transverse sectional view taken on line 8—8 of Fig. 4.
Fig. 9 is a fragmentary sectional view taken on line 9—9 of Fig. 4 but showing the parts of the hoisting unit as they appear when the boom is in its upper position as viewed in Fig. 1.

Mounted on the inner side of each bar 24 is an abutment 59 which has an arcuate abutment surface 60 which registers with and is adapted to be engaged by one edge of the adjacent link 53 during the action thereof which takes place as the boom member 21 is raised and lowered, in order to relieve the pivots 54 from a portion of the load to which they are subjected. Another abutment 61 is provided on the inner side of each lever 56 in position to engage the opposite edge of the associated link 53 when the boom member is in its upper position, as shown in Fig. 9. The abutments 59 and 61 at each side of the boom member clampingly engage the link 53 and thus rigidify the boom member and limit its movement to a predetermined upper position.

The hoisting unit B will not be herein described in detail for with the exception of the parallelogram structure of the boom member, it operates in substantially the same manner as the hoisting unit A. It should also be understood that the hoisting unit B may be identical to hoisting unit A if desired. In general, hoisting unit B includes a boom member 21' having a load receiving seat 30' at its upper end that is retained in horizontal position by non-load supporting bars 62. The boom member 21' is guided and moved between its generally horizontal and generally vertical positions by a system of links 53' and levers 56' which are substantially identical in construction to the system of links 53 and levers 56 of hoisting unit A. The lower end portion of the boom member 21' is pivotally attached to a carriage 46' which is substantially identical to the carriage 46 of hoisting unit A.

The boom members 21 and 21' of hoisting units A and B, respectively, are adapted to be raised and lowered simultaneously or individually by the action of a common screw 63, which extends longitudinal of the base structure 10 between the rails 11 and 12 thereof, as shown in Fig. 1. The screw 63 is preferably formed in sections which are connected together by couplings 64 and it is journaled in bearings carried by the end members 17 and 18 of the track structure. The screw 63 may be selectively drivingly rotated in opposite directions by a reversible motor 65 with which the screw is connected by reduction gearing 66. Any suitable electric circuit including a portable switch 67 may be employed for controlling the motor 65, and if desired, limit switches (not shown) may be included in such electric circuit for interrupting the motor drive when the boom members are in the upper and lower positions. The details of a suitable electric circuit are shown in my copending application, Serial No. 15,827.

The screw 63 extends through each hollow cylindrical casing 51 of each hoisting unit. Disposed in each casing 51, as illustrated in Fig. 5, is a nut member 68 which is threaded on the screw 63. The nut member 68 is rotatable in the casing 51 and it is provided on its exterior with spaced splines 69 between which is receivable a retractable pin 70. A pin 70 is axially shiftably and rotatably mounted in the wall of each casing 51 and provided with a helical peripheral slot 71 into which extends a fixed cam element 72. The pin 70 of each hoisting unit has an external end 73 on which is fixed a manual operating lever 74 by which the pin 70 may be rotated to extend it into and retract it from the space between the splines 69 on the nut 68. When the pin 70 is in its leftwardly extended position, shown in Fig. 5, it engages the side of one of the splines 69 of the nut 68 and holds the nut against rotation relative to the casing 51. The casing 51 is provided with opposite end walls 75 and between these walls and the ends of the nut member 68 are provided thrust bearings 76. Thus when the nut 68 is held by the pin 70 against rotation relative to the casing 51, it is also constrained against rotating with the screw 63. Therefore the nut is shifted axially of the screw in a direction depending upon the direction of rotation of the screw and it bears against one of the thrust bearings 76 which in turn urges the carriage 46 on which the nut is mounted in a corresponding direction longitudinally of the base structure 10.

In the operation of the improved hoisting apparatus the car is driven over the hoisting units A and B while they are in their lowermost positions to a location preferably established by a depression (not shown) in the floor 20 which receives a wheel of the vehicle. When the hoisting unit A is in its lowermost position, shown in Fig. 2, all portions of the boom and operating structure except the load receiving seat are located beneath the floor level and the load receiving seat is low enough to be cleared by the under structure of the vehicle. The rear axle housing of the vehicle is brought into alignment with the supporting plates 41 which may be manually adjusted if necessary to accommodate vehicles of a plurality of different lengths. The axle housing of the vehicle need not register accurately with any of the notches 42 for as the pointed ends of the teeth 42' engage the axle housings, they automatically shift the plates 41 to bring a notch of each thereof into alignment with the axle housing. The load receiving seat 30' of the hoisting unit B is so located as to engage structure at the forward end of the vehicle so that both end portions of the vehicle are rigidly supported.

When the screw 34 is rotated in a direction to shift the boom members upwardly from their lowermost positions while the control pin 70 associated with each nut member 68 is in its leftwardly extending position shown in Fig. 5, the carriage 46 of each unit is moved rightwardly as viewed in Fig. 1. Initial rightward movement of the carriage 46 shifts the link 53 and lever 56 from the position shown in Fig. 2 to that shown in Fig. 3. This initial action results in a horizontal rightward movement of the boom member 21 without significantly elevating it and at the same time brings the lever system into position to start lifting the load through an increased mechanical advantage as compared to the mechanical advantage of the lever system when it is in the position shown in Fig. 2. By increasing the mechanical advantage at this stage of the operation when its mechanical advantage is at a minimum, the maximum power requirement of the motor 65 is reduced. As the carriage 57 is shifted by continued rotation of the screw 63 to the position shown in Fig. 1, the lower end of the boom is moved toward the lower ends of the levers 56 and the mechanical advantage of the system progressively increases. During this boom raising operation the laterally spaced bars 24 and 25 of the boom structure serve to sustain the load applied on the load receiving seat 30 and because of the parallelogram relationship in which they are disposed they also maintain the load receiving seat 30 horizontal throughout the entire range of movement of the boom.

As the boom member 21 is initially raised from the position shown in Fig. 3 the links 53 engage the abutments 59 and during further upward movement of the boom the links bear against the arcuate surfaces 60 of the abutments 59. In this manner some of the load which would otherwise be applied on the pivots 54 of the links 53, is applied directly upon the bar 24 of the boom. The abutments 59 also serve to arrest counter-clockwise rotation of the levers 53 as the link 56 is brought to a more advantageous mechanical position in the manner above described. When the boom member 21 reaches its uppermost position the abutments 61 on the levers 56 engage the edge portions of the links 53 opposite from those which are engaged by the abutments 59. Thus the links 53 are held against counter-clockwise movement beyond their upright positions shown in Fig. 1 and the links 53 are so clampingly engaged, as illustrated in Fig. 9, between the abutments 59 and 61 as to effectively rigidify the boom member in its upper position.

Either the hoisting unit A or hoisting unit B may be operated independently of the other if desired by merely so rotating the operating handle 74 of either hoisting unit as to withdraw the pin 70 from engagement with the splines of the nut 68, thus allowing the nut to rotate with the screw so that it becomes ineffective to shift the carriage 46. Since the nut and screw have irreversible pitch threads, when the screw 63 is held at rest, it retains the boom structure in any position to which it has been raised. While rotation of the screw 63 in one direction raises the boom members, rotation of it in an opposite direction likewise lowers the boom members by shifting the carriages 46 leftwardly as viewed in Fig. 1 and ultimately brings the entire hoisting unit to the position shown in Fig. 2.

Although but one specific embodiment of the invention is herein shown and described, it will be understood that various changes in the sequence of operations, steps and materials employed may be made without departing from the spirit of the invention.

I claim:

1. A load receiving support for the boom member of hoisting apparatus including a stationary bracket adapted to be fixed to an end portion of said boom member, and a load receiving seat element freely linearly shiftably mounted on said bracket having an upwardly extending exposed edge portion provided with a series of spaced notches aligned in parallel relationship to the direction of linear shifting movement of said seat element for receiving a portion of said load and intermediate substantially pointed tapering lands between said notches having opposite downwardly diverging sides for contacting said portion of said load when said portion of said load is not aligned with at least one of said notches and shifting said seat element to bring one of its notches into alignment with said portion of said load.

2. A load receiving support for the lifting member of vehicle hoisting apparatus including a stationary part adapted to be fixed to said lifting member, and a load receiving seat element freely shiftably mounted on said stationary part for horizontal movement in respectively opposite directions longitudinally of a vehicle positioned to be elevated by said hoisting apparatus, said seat element having an upwardly extending exposed edge portion provided with a series of spaced notches arranged in alignment in said directions of movement of said seat element for receiving a portion of said vehicle and having intermediate substantially pointed tapering lands between said notches, said lands having opposite, downwardly diverging and inclined sides engageable with said portion of said vehicle for shifting said seat element to bring a notch thereof into alignment with said vehicle portion.

3. A load receiving support for vehicle hoisting apparatus including a main body portion, an elongated load receiving seat shiftably mounted on said main body portion for horizontal movement in respectively opposite directions, and means on said main body portion for positively opposing movement of said seat element in all other directions relative to said main body portion, said seat element having an upwardly extending exposed side portion provided with a series of spaced notches arranged in alignment in the directions of movement of said seat element for receiving a portion of a load and intermediate substantially pointed tapering lands between adjacent notches having inclined opposite sides, the upper extremity of each land being substantially pointed for directing said portion of said load into a notch adjacent thereto during approaching movement of said seat element and load.

4. Vehicle hoisting apparatus including a base structure, a pair of spaced hoisting units mounted on said base structure for raising and lowering the front and rear end portions of a vehicle, each of said units including a boom member, a load receiving support on the boom member of one of said hoisting units engageable with front end portions of a vehicle, a second load receiving support including a main body portion fixed to the boom member of the other hoisting unit and a self-adjusting load receiving seat element shiftably mounted on said main body portion for horizontal movement in respectively opposite directions relative to said main body portion and relative to said first mentioned load receiving support, means on said main body portion for holding said shiftable seat element against other movement relative thereto, said seat element having a plurality of longitudinally spaced notches arranged in alignment in said directions of movement of said shiftable seat element for receiving the rear axle housing of vehicles of different lengths and constructions, and said seat element bing provided with substantially pointed lands intermediate said notches having oppositely inclined surface defining adjacent sides of adjacent notches, said inclined surfaces of said lands being engageable with said axle housing during approaching movement of said seat element and axle housing for shifting said seat element to align a notch thereof with said rear axle housing.

5. In hoisting apparatus, a boom member comprising laterally spaced parallelogram structures, each including a pair of spaced load sustaining substantially parallel bars and an interconnecting link, means pivotally attaching one of said links at spaced locations to the bars of each pair of bars respectively, a load receiving seat structure extending between the upper end portions of said parallelogram structures including means pivotally attached to the bars of each of said parallelogram structures, respectively, at locations spaced substantially equal to the distance between said first mentioned locations and operating mechanism for raising and lowering said boom member having an element connected with one of said interconnecting links.

6. In hoisting apparatus, a boom member comprising laterally spaced parallelogram structures, each including a pair of spaced load sustaining substantially parallel bars and an interconnecting link, means pivotally attaching one of said links at spaced locations to the bars of each pair of bars respectively, a load receiving seat structure extending between and connecting the upper end portions of said parallelogram structures including means extending between and pivotally attached to the bars of each of said parallelogram structures, respectively, at locations spaced substantially equal to the distance between said first mentioned locations, a support for the lower end portions of said parallelogram structures, means pivotally connecting the bars of each of said parallelogram structures to said support for movement about axes at locations spaced substantially equal to the distance between said first mentioned locations, and mechanism for shifting said boom member about said pivotal axes between generally horizontal and generally upright positions including a yoke structure having each of its opposite end portions pivoted on one of said interconnecting links respectively and an operating lever pivoted on an intermediate portion of said yoke structure.

7. In hoisting apparatus, a boom member comprising laterally spaced parallelogram structures, each including a pair of spaced load sustaining substantially parallel bars and an interconnecting cleat element, means pivotally attaching one of said cleat elements at spaced locations to intermediate portions of the bars of each pair of bars respectively, a load receiving seat structure extending between the upper end portions of said parallelogram structures including means pivotally attached to the bars of each of said parallelogram structures, respectively, at locations spaced substantially equal to the distance between said first mentioned locations, a support for the lower end portions of said parallelogram structures, means pivotally connecting the bars of each of said parallelogram structures to said support for movement about axes at locations spaced substantially equal to the distance between said first mentioned locations, mechanism for shifting said boom member about said pivotal axes between generally horizontal and generally upright positions including a pair of levers, a pair of links, one pivoted at one end to one end of each of said levers respectively and each of said links being pivoted at its opposite end to the cleat of one of said parallelogram structures respectively, and means for producing relative shifting movement between the other ends of said levers and the lower ends of said parallelogram structures for raising said boom member.

8. In hoisting apparatus, a boom member comprising a parallelogram structure including a pair of spaced load sustaining substantially parallel bars and an interconnecting cleat element, means pivotally attaching said cleat element at spaced locations to intermediate portions of said bars, a load receiving seat structure on the upper end portion of said parallelogram structure including means pivotally attached to the upper end portions of each of said bars at locations spaced substantially equal to the distance between said first mentioned locations, a support for the lower end portion of said parallelogram structures, means pivotally connecting each bar of said parallelogram structure to said support for movement about axes at locations spaced substantially equal to the distance between said first locations, and mechanism for shifting said boom member about said pivotal axes between generally horizontal and generally upright positions including an operating member pivotally connected to said cleat at a location between its pivotal attachments to said bars.

9. In hoisting apparatus, a boom member comprising a parallelogram structure including a pair of spaced load sustaining substantially parallel bars and an interconnecting cleat element, means pivotally attaching said cleat element at spaced locations to intermediate portions of said bars, a load receiving seat structure on the upper end portion of said parallelogram structure including means pivotally attached to the upper end portions of each of said bars at locations spaced substantially equal to the distance between said first mentioned locations, a support for the lower end portion of said parallelogram structures, means pivotally connecting each bar of said parallelogram structure to said support for movement about axes at locations spaced substantially equal to the distance between said first locations, and mechanism for shifting said boom member about said pivotal axes between generally horizontal and generally upright positions including a lever, a link pivoted at one end to one end of said lever and at its opposite end to said cleat and means for producing relative shifting movement between the other end of said lever and the lower end of said parallelogram structure for raising said boom member.

10. In hoisting apparatus, a boom member comprising a parallelogram structure including a pair of spaced load sustaining substantially parallel bars and an interconnecting cleat element, means pivotally attaching said cleat element at spaced locations to intermediate portions of said bars, a load receiving seat structure on the upper end portion of said parallelogram structure including means pivotally attached to the upper end portions of each of said bars at locations spaced substantially equal to the distance between said first mentioned locations, a support for the lower end portion of said parallelogram structures, means pivotally connecting each bar of said parallelogram structure to said support for movement about axes at locations spaced substantially equal to the distance between said first locations, and mechanism for shifting said boom member about said pivotal axes between generally horizontal and generally upright positions including a lever, a link pivoted at one end to one end of said lever and at its opposite end to said parallelogram structure, and means for producing relative shifting movements between the other end of said lever and the lower end of said parallelogram structure for raising said boom member including a rotatable screw member and a nut threaded thereon for movement longitudinal of said screw member during its rotation, said means also including a member shiftably mounted on said support and selectively engageable with and disengageable from said nut for holding said nut against rotation with said screw and accommodating such rotation respectively.

11. In vehicle hoisting apparatus including a base structure; a pair of hoisting units each including a boom member mounted on said base structure for shifting movements between generally horizontal and generally vertical positions, a load receiving seat on the upper end portion of said boom member, a lever system for producing and guiding said shifting movements of said boom member including a lever member pivotally connected at its upper end with a longitudinally intermediate portion of said boom member, means pivotally attaching the lower end of said lever member to said base structure, a support element pivotally and shiftably mounting the lower end of said boom member on said base structure, and means for shifting said support element and the lower end portion of said boom member relative to said lower end of said lever for raising said boom member including a screw rotatably mounted on said base structure, a pair of nut elements threaded on said screw one associated with the support element of each of said hoisting units respectively and mechanism for releasably securing each of said nut elements to its associated support respectively and against rotation with said screw for selectively raising the boom member of either or both of said hoisting units, said mechanism including a manually controllable element shiftably mounted on each of said support elements respectively and selectively engageable with and disengageable from an associated one of said nut elements respectively.

12. In hoisting apparatus, a boom member comprising a parallelogram structure including a pair of spaced parallel bars and an interconnecting cleat element, means pivotally attaching said cleat element at spaced locations to intermediate portions of said bars, a load receiving seat on the upper end portions of said boom member, a support for the lower end portion of said parallelogram structure, means pivotally connecting each of said bars to said support for movement about spaced axes, a link element, a pivot connecting one end of said link element to said cleat, a lever element pivoted at its upper end to the other end of said link element, a first abutment on one of said bars having an arcuate abutment surface engageable with one side of said link during pivotal movement thereof for relieving the load on said pivot, a second abutment on said lever engageable with the opposite side of said link when said boom member is in its upper position for limiting upward movement of said boom member, said link being clampingly engaged between said abutments to rigidify said boom member in its upper position, and means for producing relative shifting movement between the lower ends of said boom member and lever element to raise said boom member through the action of said link and lever elements.

13. In hoisting apparatus, a boom member comprising a parallelogram structure including a pair of spaced parallel bars and an interconnecting cleat element, means pivotally attaching said cleat element at spaced locations to intermediate portions of said bars, a load receiving seat on the upper end portion of said boom member, a support for the lower end portion of said parallelogram structure, means pivotally connecting each of said bars to said support for movement about spaced axes, a link element, a pivot connecting one end of said link element to said cleat, a lever element pivoted at its upper end to the other end of said link element, an abutment on one of said bars having an arcuate abutment surface engageable with said link during pivotal movement thereof for relieving the load on said pivot, and means for producing relative shifting movement between the lower ends of said boom member and lever element to raise said boom member through the action of said link and lever elements.

14. Vehicle hoisting apparatus including a base structure, a pair of hoisting units mounted on said base structure each including a boom member shiftable between generally horizontal and generally vertical positions, mechanism for selectively simultaneously raising said boom members and raising only one thereof respectively including a screw extending longitudinally of and rotatably mounted on said base structure and a pair of nut elements threaded on said screw, one operatively connected with each of said hoisting units respectively for raising the boom member thereof, one of said nuts being rotatable with said screw and relative to its associated hoisting unit, and means for releasably holding said last mentioned nut against rotation relative to the hoisting unit with which it is associated.

15. In vehicle hoisting apparatus including a base structure; a pair of hoisting units each including a boom member mounted on said base structure for shifting movements between generally horizontal and generally vertical positions, a load receiving seat on the upper end portion of each of said boom members, lever systems for producing and guiding said shifting movements of said boom members each including a lever member pivotally connected at its upper end with a longitudinally intermediate portion of one of said boom members respectively, means pivotally attaching the lower end of each of said lever members to said base structure, support elements pivotally and shiftably mounting the lower ends of said boom members on said base structure, and actuating mechanism for producing relative shifting movements between the lower ends of said boom and lever members for raising said boom members including a screw rotatably mounted on said base structure and a pair of nut elements threaded on said screw one associated with the support element of each of said hoisting units respectively, said actuating mechanism including a means for holding each of said nut elements against rotation relative to its associated support element and said last named means including an element shiftably mounted on at least one of said support elements and engageable with and disengageable from one of said nut elements for selectively effecting raising of only one or both of said boom members.

DAVID A. WALLACE.

REFERENCES CITED

The following references are of record in the file of this patent:

UNITED STATES PATENTS

| Number | Name | Date |
| --- | --- | --- |
| 1,725,216 | Seldomridge | Aug. 20, 1929 |
| 2,015,357 | Weaver | Sept. 24, 1935 |
| 2,402,572 | Page | June 25, 1946 |
| 2,540,428 | Cochin | Feb. 6, 1951 |

FOREIGN PATENTS

| Number | Country | Date |
| --- | --- | --- |
| 297,907 | Italy | June 23, 1932 |
| 844,662 | France | Apr. 24, 1939 |